United States Patent
Massold et al.

(10) Patent No.: US 10,232,390 B2
(45) Date of Patent: Mar. 19, 2019

(54) COVER FOR LIQUID CONTAINER OF SPRAY GUN

(71) Applicants: Andreas Massold, Balingen (DE); Frank Sommer, Balingen (DE); Markus Zeymer, Wetterzeube (DE)

(72) Inventors: Andreas Massold, Balingen (DE); Frank Sommer, Balingen (DE); Markus Zeymer, Wetterzeube (DE)

( * ) Notice: Subject to any disclaimer, the term of this patent is extended or adjusted under 35 U.S.C. 154(b) by 0 days.

(21) Appl. No.: 15/218,038

(22) Filed: Jul. 24, 2016

(65) Prior Publication Data
US 2017/0056903 A1    Mar. 2, 2017

(30) Foreign Application Priority Data
Aug. 25, 2015  (EP) .................................. 15182356

(51) Int. Cl.
| | | |
|---|---|---|
| B05B 7/24 | (2006.01) | |
| B05B 15/40 | (2018.01) | |
| B01D 29/35 | (2006.01) | |
| B65D 47/06 | (2006.01) | |
| B65D 51/16 | (2006.01) | |

(52) U.S. Cl.
CPC ............ B05B 7/2408 (2013.01); B01D 29/35 (2013.01); B05B 15/40 (2018.02); B65D 47/06 (2013.01); B65D 51/1616 (2013.01); B05B 7/2478 (2013.01)

(58) Field of Classification Search
CPC .... B01D 29/35; B65D 47/06; B65D 51/1616; B05B 15/008; B05B 7/2408
See application file for complete search history.

(56) References Cited

U.S. PATENT DOCUMENTS

| | | | | |
|---|---|---|---|---|
| 856,361 | A * | 6/1907 | Neiburg | C02F 1/46176 184/6.24 |
| 1,164,453 | A * | 12/1915 | Belles | A47J 31/14 215/317 |
| 3,432,104 | A * | 3/1969 | Kaltenbach | B05B 7/2408 239/328 |
| 3,912,638 | A * | 10/1975 | Beaubien | B01D 29/085 210/455 |
| 3,980,563 | A * | 9/1976 | Greutert | A47J 19/027 210/232 |
| 4,287,066 | A * | 9/1981 | Greutert | A47J 31/446 209/397 |
| 4,312,753 | A * | 1/1982 | Bell | B01D 35/0273 210/250 |

(Continued)

FOREIGN PATENT DOCUMENTS

| | | |
|---|---|---|
| DE | 29825120 U1 | 2/2005 |
| EP | 1366 823 B1 | 12/2003 |
| EP | 1902786 A1 | 3/2008 |

*Primary Examiner* — Paul R Durand
*Assistant Examiner* — Randall A Gruby
(74) *Attorney, Agent, or Firm* — Von Rohrscheldt Patents

(57) ABSTRACT

The invention relates to a plastic injection molded cover for a liquid container for a spray gun. The cover includes an elongated tapered filter arranged in a connecting spout and including a filter frame which a integrally provided in one piece with the cover and into which a filter medium is embedded. The covers are stackable, wherein the filters are inserted into each other and can be longer than a distance of stacked covers.

2 Claims, 1 Drawing Sheet

(56) References Cited

U.S. PATENT DOCUMENTS

| | | | | |
|---|---|---|---|---|
| 4,882,055 A * | 11/1989 | Stamstad | B01D 29/111 | 210/483 |
| 5,059,319 A * | 10/1991 | Welsh | B01D 29/01 | 210/232 |
| 5,252,204 A * | 10/1993 | Chiodo | B01D 29/111 | 210/232 |
| 5,266,194 A * | 11/1993 | Chiodo | B01D 29/111 | 210/232 |
| 5,417,860 A * | 5/1995 | Kay | B01D 35/04 | 210/472 |
| 5,616,242 A * | 4/1997 | Mandola | B01D 35/02 | 210/238 |
| 5,738,786 A * | 4/1998 | Winnington-Ingram | A47G 19/16 | 206/5 |
| 6,202,857 B1 * | 3/2001 | Keller | B07B 1/4618 | 209/401 |
| 6,458,303 B1 * | 10/2002 | Fuehrer | B01D 29/071 | 210/455 |
| 6,588,681 B2 * | 7/2003 | Rothrum | B01F 15/0491 | 239/328 |
| 6,689,279 B1 * | 2/2004 | Train | B01D 17/0208 | 210/514 |
| 6,752,179 B1 * | 6/2004 | Schwartz | B05B 7/2408 | 141/114 |
| 6,796,514 B1 * | 9/2004 | Schwartz | B05B 7/2408 | 239/318 |
| 6,994,738 B2 * | 2/2006 | Taddey | B01D 45/04 | 55/306 |
| 7,823,806 B2 * | 11/2010 | Schmon | B05B 7/2408 | 239/290 |
| 8,127,963 B2 * | 3/2012 | Gerson | B05B 7/2408 | 220/495.02 |
| 8,563,264 B2 * | 10/2013 | Halverson | G01N 1/38 | 435/30 |
| 8,925,836 B2 * | 1/2015 | Dettlaff | B05B 7/2478 | 215/357 |
| 8,944,351 B2 * | 2/2015 | Pellegrino | B05B 7/2408 | 239/569 |
| 9,108,794 B2 * | 8/2015 | Fu | A47J 31/08 | |
| 9,586,220 B2 * | 3/2017 | Pellegrino | B05B 7/2408 | |
| 9,629,494 B2 * | 4/2017 | Fu | A47J 31/06 | |
| 9,855,571 B2 * | 1/2018 | Camilleri | B01F 15/00512 | |
| 9,878,336 B2 * | 1/2018 | Gehrung | B05B 7/2408 | |
| 2002/0134861 A1 * | 9/2002 | Petrie | B05B 7/2408 | 239/345 |
| 2004/0140373 A1 * | 7/2004 | Joseph | B05B 7/2408 | 239/379 |
| 2004/0217201 A1 * | 11/2004 | Ruda | B05B 7/2408 | 239/376 |
| 2004/0256485 A1 * | 12/2004 | Joseph | B05B 7/2408 | 239/302 |
| 2006/0000927 A1 * | 1/2006 | Ruda | B05B 7/2478 | 239/345 |
| 2006/0065591 A1 * | 3/2006 | Joseph | B01D 29/15 | 210/473 |
| 2006/0102550 A1 * | 5/2006 | Joseph | B05B 7/2408 | 210/464 |
| 2006/0131446 A1 * | 6/2006 | Vicentini | B05B 7/2478 | 239/526 |
| 2007/0164060 A1 * | 7/2007 | Hayday | B05B 11/045 | 222/633 |
| 2007/0269341 A1 * | 11/2007 | Halverson | G01N 1/34 | 422/400 |
| 2009/0014557 A1 * | 1/2009 | Schmon | B05B 7/2408 | 239/302 |
| 2009/0283545 A1 * | 11/2009 | Kimball | B05B 11/0059 | 222/189.06 |
| 2011/0073607 A1 * | 3/2011 | Fu | B65D 85/8043 | 220/711 |
| 2012/0273583 A1 * | 11/2012 | Gerson | B05B 7/2408 | 239/1 |
| 2015/0104730 A1 * | 4/2015 | Massold | B01D 46/0001 | 429/508 |

* cited by examiner

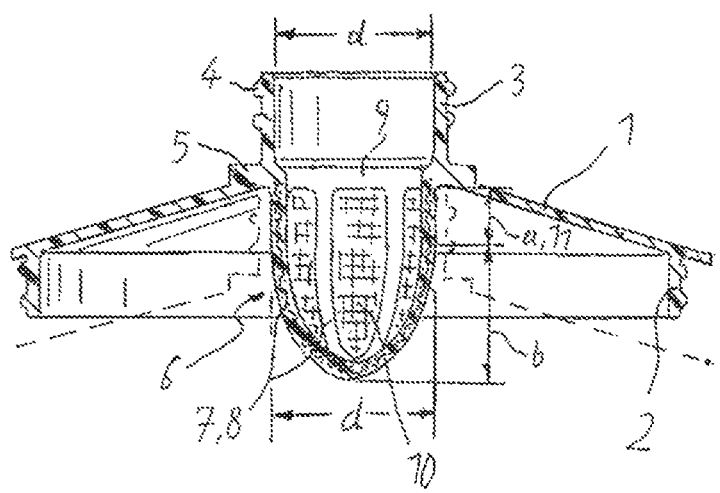

COVER FOR LIQUID CONTAINER OF SPRAY GUN

RELATED APPLICATIONS

This application claims priority from and incorporates by reference European Patent Applications EP 15 182 356.4 filed on Aug. 25, 2015.

FIELD OF THE INVENTION

The invention relates to a cover for a liquid container of a spray gun with the features of the preamble of claim 1. The cover is provided in particular for a paint container for painting with a compressed air spray gun or another spray gun.

BACKGROUND OF THE INVENTION

The document EP 1 366 823 B1 discloses a beaker shaped liquid container made from a plastic material with a clip on cover that is also made from the plastic material. The cover is shaped as a flat hollow frustum with a coaxial cylindrical tube shaped connecting spout which is provided as an integral part in one piece with the cover for providing a disengageable connection with a spray gun. The connecting spout is used for mechanically connecting the cover including the snap locked in container with the spray gun and also for feeding liquid from the container into the spray gun. A cylindrical tube shaped filter is arranged in a coaxial extension of the connecting spout in the cover in a disengageable manner. The filter includes a filter frame and a ring at an open face end wherein the ring is inserted from an inside in a clamping manner into the connecting spout. Thus, the filter is connected with the cover in a clamping and disengageable manner through the plug in connection. Liquid from the container flows through the filter on a path through the connecting spout into the spray gun.

BRIEF SUMMARY OF THE INVENTION

It is an object of the invention to provide a more economical method of production for a cover with a connecting spout and a filter for a liquid container for a spray gun.

The object is achieved by a cover for a liquid container for a spray gun, the cover including a tubular connecting spout for a disengageable connection with a spray gun, wherein the cover is made from a plastic material, wherein the cover includes a filter, wherein a filter medium is attached and embedded at the cover at attachment portions in a master formed plastic material of the cover, or wherein the filter medium is provided as an integral component in one piece with the cover made by master forming.

The cover according to the invention is provided for a liquid container for a spray gun. The cover is master formed from a plastic material in particular through an injection molding The cover includes a tubular connecting spout for a disengageable connection through plugging, snap locking or a threaded connection. Advantageously but not necessarily the connecting spout has a circular cross section and is shaped for example cylindrical or as a frustum. The cover includes a filter whose filter medium has attachment portions for attaching at the cover which attachment portions are embedded in the master formed plastic material of the cover. The filter medium can contact a filter frame also on an outside or on an inside or the filter medium can be arranged at the filter frame. This means "embedded" according to the invention. The filter medium is an element of the filter which is flowed through when liquid flows out of the liquid container through, the connecting spout of the cover to the spray gun wherein the filter medium retains solid particles and mechanically separates them from the liquid. The filter medium is for example a fleece, a tissue or a knitted material. The filter or the filter medium can also be a screen. The enumeration is exemplary and not exclusive. Portions are designated as attachment portions of the filter medium wherein the portions are embedded into the plastic material of the cover. An attachment portion is in particular a circumferential edge at a face end of the filter medium which is oriented towards the cover or the connecting spout. Additional filter portions are for example portions of the filter mediums that are embedded for example in ribs or similar of a filter frame of the filter. For example the plastic material of the cover in which the attachment portion of the filter medium are embedded forms a type of matrix for the filter medium which is known for example from fiber composite materials. Embedding the attachment portions of the filter medium is performed for example during injection molding the plastic cover, thus in particular in that the filter medium is inserted into an injecting molding tool for the cover, the injecting molding tool is closed and the plastic material forming the cover including the filter frame for the filter medium is injected into the injection mold. Thus, attaching the filter at the cover is performed in one step when master forming the cover which makes assembling, joining or another attachment of the filter or the filter medium in an additional method step after producing the cover redundant.

An alternative is a filter medium which is an integral one piece component of the cover and co injected together with the cover. In this case the filter medium is made from the same plastic material as the cover and the filter medium is master formed together with the cover. The filter in this case for example is a screen. Like for a filter medium embedded into a filter frame of the cover an attachment of the filter at the cover is performed during production of the cover in one process step together with the filter which makes assembling joining or otherwise attaching the filter or the filter medium at the cover in an additional process step after the production of the cover redundant.

An embodiment of the invention provides that the cover includes a filter frame for the filter medium which filter frame is integrally provided in one piece with the cover wherein the attachment portions for the filter medium are embedded in the cover. The filter frame supports the filter medium and keeps it in a predetermined shape.

An embodiment of the invention provides a tubular filter which can also be designated as a hose shaped filter A cross section, however, is not per definition circular, any type of tube or hose cross sections are feasible.

An embodiment provides that the tubular filter tapers down from an open end so that plural filters can be inserted in to each other in a space saving manner like hollow frustums. The covers where the filters are attached are stacked on top of one another or behind one another with identical axes when the filters are inserted into one another. This facilitates space saving storage of covers with filters in a small package size.

In an advantageous embodiment of the invention the filter is arranged within an enveloping surface of an inside of the connecting spout of the cover. Put differently a largest cross section of the filter is not greater than a smallest inner cross section of the connecting spout of the cover and does not laterally protrude beyond an axial projection of a smallest inner cross section of the connecting spout. Also this embodiment of the invention is used for space saving stacking of covers according to the invention with their filters because filters of stacked covers can protrude into connecting spouts of respective adjacent covers. In this embodiment of the invention the filter does not act as a spacer which forces a minimum distance of the covers during stacking but a distance of stacked covers can be smaller than an axial extension of the filter. A sufficiently long axial extension of the filter is important for a sufficiently large flowable surface of the filter medium, in particular when a cross section of the filter is small or not greater than a smallest inner cross section of the connecting spout of the cover. The filter can project from the cover in an identical direction and/or in an opposite direction as the connecting spout. The filter can penetrate the connecting spout partially or completely and/or can protrude from the connecting spout.

An embodiment of the invention provides that the cover has a coupling that is coaxial to the connecting spout into which or onto which a connecting spout of another cover is pluggable. Also this embodiment of the invention is configured for stacking plural covers for storage and transportation with a small package size. The coupling of a cover and the connecting spout of another cover form a plug connector which is configured for plugging two covers together in order to stack them. The filter or a section of the filter can be the coupling which is retained in a clamping manner or with a clip connection in the connecting spout when covers are stacked.

A distance of plugged together, this means stacked covers is advantageously smaller than an axial extension of their filters.

BRIEF DESCRIPTION OF THE DRAWING FIGURE

The invention is subsequently described in more detail based on an embodiment illustrated in the drawing FIGURE. The only drawing FIGURE illustrates an axial sectional view of a cover according to the invention.

DETAILED DESCRIPTION OF THE INVENTION

The cover 1 according to the invention illustrated in the drawing FIGURE is provided for a beaker shaped non illustrated liquid container for a compressed air gun or other spray, gun which is also not illustrated either. In particular the cover 1 is provided for a paint container for painting with the spray gun that is not illustrated. The cover 1 is made by plastic injection molding, this means it is master formed. The cover has a shape of a flat, that means obtuse angled hollow frustum from whose inside a hollow cylindrical collar 2 extends coaxially and proximal to the edge wherein the collar is used for piecing the cover 1 onto the liquid container that is not illustrated. The collar 2 of the cover 1 is insertable into an open side of the beaker shaped liquid container so that the collar 2 of the cover 1 is clamped fluid tight in the open side of the beaker shaped liquid container.

On an outside of a cover 1 a cylindrical tube shaped connecting spout 3 extends in a coaxial manner from the cover 1 wherein the connecting spout is an integral part of the cover 1 like the collar 2. The connecting spout 3 is used for a disengageable connection with the non-illustrated spray gun, wherein the connection mechanically supports the cover 1 at the spray gun together with the liquid container including the liquid and wherein the cover 1 also provides a liquid supply from the liquid container to the spray gun through the connecting spout of the cover 1. The disengageable connection of the connecting spout 3 of the cover 1 with the spray gun is liquid tight. In the embodiment the disengageable connection it is a plug in connection wherein the connecting spout 3 includes externally circumferential beads 4 which provide good clamping support for the plug in connection of the connecting spout of the cover 1 with the spray gun as well as a liquid tight seal. Other disengageable connections like e.g. threaded connections or snap locking connections are also possible. At a base of the connecting spout 3, this means at a transition from the connecting spout 3 into the hollow frustum shaped portion of the cover 1 the cover 1 includes an annular shoulder 5 configured as an axial stop at the non-illustrated spray gun.

The cover 1 includes a filter 6 at a base of the connecting spout 3, thus at a transition from the connecting spout 3 into the hollow frustum shaped portion of the cover 1, thus at an inside of the connecting spout 3 and at an inside of the cover 1, wherein the filter 6 protrudes at the inside of the cover 1 coaxially from the connecting spout 3. The filter 6 is shaped tubular or hose shaped and includes an open end and a closed end, wherein the open end is oriented towards the connecting spout 3 and leads into the connecting, spout 3. The filter 6 is arranged within a cylinder defined by an inner enveloping surface of the connecting spout 3. A largest cross section of the filter 6 is not greater than an inner diameter d of the connecting spout 3 or generally than a smallest inner cross section of the connecting spout 3. The filter 6 does not protrude outward beyond a circumference of a smallest inner cross section with a diameter d of an open portion of the connecting spout 3 oriented away from the filter 6. This facilitates plugging on a connecting spout 3 of another cover 1 for stacking covers 1. The filter 6 can be for example hollow cylindrical or hollow frustum shaped. In the embodiment the filter 6 includes a hollow cylindrical section a, adjoining the connecting spout. 3 wherein the hollow cylindrical section a subsequently transitions into a shape of an elongated half ellipsoid b.

In another embodiment the filter can also protrude from the connecting spout 3 at an outside of the cover 1 (not illustrated), thus opposite to the direction illustrated in the drawing FIGURE and/or the filter can penetrate the connecting spout 3 partially or completely and can optionally protrude from the connecting spout 3 (not illustrated). When the filter penetrates the connecting spout 3 there is advantageously an annular intermediary space between the connecting snout 3 and the filter.

The filter 6 includes a filter frame 7 with ribs 8 that are arranged distributed over a circumference and a circumferential ring 9 that is arranged at a base of the connecting spout 3 on an inside of the connecting spout 3. The ribs 8 are arranged in axial planes of the rotation symmetrical cover 1 and extend in a hollow cylindrical section a of the filter 6 parallel to the axis and in a straight line and subsequently transition into semi elliptical arcs in the half ellipsoid section b of the filter 6 wherein the semi elliptical arcs intersect at an end of the filter 6 that is oriented away from the connecting spout 3 and closed. In the hollow cylindrical section a of the filter 6 outsides of the ribs 8 of the filter frame 7 of the filter 6 which extend in a straight line at this location and parallel to the axis have a distance from each other which corresponds to an inner diameter of the connecting spout 3.

At the base of the connecting spout 3 the filter frame 7 of the filter 6 transitions into the connecting spout 3 or the cover 1 integrally in one piece. The filter frame 7 is produced through plastic injection molding in one process step together with the cover 1.

The filter 6 includes a filter fabric configured as a filter medium 10 wherein the filter fabric has the shape of the filter 6. In the embodiment the filter medium 10 is hollow cylindrical in a section starting at an open end and the filter medium 10 transitions into a section that is shaped as an elongated half ellipsoid. The filter medium 10 is embedded in the plastic material of the filter frame 7, thus in the ribs 8 and the ring 9. Portions of the filter medium 10 which are embedded in the ribs 8 and embedded at an edge at an open end of the filter medium 10 or of the filter 6 into the ring 9 of the filter frame 7 can also be considered as attachment portions of the filter medium 10. During production of the cover 1 the filter medium 10 is inserted into an injection molding tool that is not shown which is subsequently closed and into which the plastic material forming the cover 1 including the collar 2, the connecting spout 3 and the filter frame 7 is subsequently injected. In the portion of the ring 9 and of the ribs 8 of the filter frame 7 plasticized plastic material flows through the filter medium 10 so that the filter medium 10 is embedded in the plastic material in these portions designated as attachment portions. The plastic material forms a type of matrix for the embedded attachment portions of the filter medium 10 which is comparable to a fiber composite material.

The filter 6 including the filter medium 10 can also be injection molded integrally in one piece together with the cover 1, this means the entire cover 1 together with the connecting spout 3 and the filter 6 including filter medium 10 is one single injection molded component.

The hollow cylindrical section a of the filter 6 or the ribs 8 of the filter frame 7 extending in a straight line and parallel to the axis in the hollow cylindrical section a of the filter 6 in axial planes of the cover 1 form a coupling 11 that is coaxial to the connecting spout 3 wherein a connecting spout 3 of an additional cover 1 is attachable onto the coaxial coupling as indicated with dashed lines in the drawing FIGURE. The filter 6 or its hollow cylindrical section a, which forms the coupling 11 is clamped and retained in the connecting spout of the additional cover 1. This way covers 1 are stackable for storage and transporting. The filters 6 are placed into each other when plugging the covers 1 together. Due to the hollow shape of the filters 6 that tapers in one direction a distance of the covers 1 during stacking of the filters 6 is not predetermined by a length or axial extension of the filter 6. The filter 6 can thus be configured long in axial direction in order to provide a sufficiently large filter surface.

In the embodiment a distance of the cover 1 is determined during stacking by an axial height of the connecting spout 3.

The filter 6 filters liquids which flow out from the non-illustrated liquid container to which the cover 1 is applied and through the connecting spout 3. In case stackability of the cover 1 is irrelevant the filter 6 can have different shapes and can be larger, in particular in a radial direction, than an inner diameter of the connection spout 3, this means the filter 6 can extend in this case also beyond the cylindrical enveloping surface of the inside of the connecting spout 3 in the outward direction.

What is claimed is:

1. A master formed cover for a liquid container for a spray gun, the master formed cover comprising:
    a tubular connecting spout for a disengageable connection with a spray gun,
    wherein the tubular connecting spout is integrally master formed in one piece within with the master formed cover, and
    wherein the master formed cover is made from a plastic material and includes a tubular filter comprising a filter medium, wherein the filter tapers from an open end of the filter so that plural filters are insertable into each other, wherein the filter is arranged within a cylinder defined by an inner diameter of the tubular connecting spout,
    wherein the master formed cover includes a coupling and a radially protruding shoulder wherein the shoulder has a bottom surface, and
    wherein a connecting spout of an identical master formed cover is connectable to the coupling so that plural master formed covers are pluggable together coaxially to form a stack such that a top surface of the connecting spout abuts the bottom surface,
    wherein the master formed cover includes a filter frame that is integrally provided in one piece within with the master formed cover, and wherein the filter medium is integrally provided in one piece with the filter frame,
    which filter medium has attachment portions,
    which attachment portions are embedded in the plastic material of the cover.

2. The cover according to claim 1,
    wherein the master formed cover includes a filter frame that is integrally provided in one piece with the master formed cover, and
    wherein the filter medium is integrally provided in one piece with the filter frame.

* * * * *